(12) United States Patent
Qin et al.

(10) Patent No.: US 12,246,636 B2
(45) Date of Patent: Mar. 11, 2025

(54) UTILITY VEHICLE FOR POWER EMERGENCY REPAIR

(71) Applicants: STATE GRID HUZHOU POWER SUPPLY COMPANY, Zhejiang (CN); Zhejiang Tailun Power Group Co., Ltd., Zhejiang (CN)

(72) Inventors: Weixun Qin, Zhejiang (CN); Jing Xu, Zhejiang (CN); Jian Wu, Zhejiang (CN); Hong Ding, Zhejiang (CN); Yongsheng Xu, Zhejiang (CN); Xun Wang, Zhejiang (CN); Zhen Wang, Zhejiang (CN); Xinlong Wu, Zhejiang (CN); Xiaobin Shen, Zhejiang (CN); Size Zhang, Zhejiang (CN); Shijun Chen, Zhejiang (CN); Jie Chai, Zhejiang (CN); Xiaoxiao Wu, Zhejiang (CN)

(73) Assignees: STATE GRID HUZHOU POWER SUPPLY COMPANY, Zhejiang (CN); Zhejiang Tailun Power Group Co., Ltd., Zhejiang (CN)

(\*) Notice: Subject to any disclaimer, the term of this patent is extended or adjusted under 35 U.S.C. 154(b) by 469 days.

(21) Appl. No.: 17/880,666

(22) Filed: Aug. 4, 2022

(65) Prior Publication Data
US 2023/0211718 A1 Jul. 6, 2023

(30) Foreign Application Priority Data
Jan. 6, 2022 (CN) .......................... 202210009975.5

(51) Int. Cl.
*B60P 3/18* (2006.01)
*B60R 1/26* (2022.01)
(Continued)

(52) U.S. Cl.
CPC .................. *B60P 3/18* (2013.01); *B60R 1/26* (2022.01); *F21S 8/08* (2013.01); *F21V 21/22* (2013.01);
(Continued)

(58) Field of Classification Search
CPC ............ B60P 3/14; B60P 3/18; B60Q 1/0035; B60Q 1/02; B60Q 1/24; B60Q 1/245; B60Q 1/249; B60R 1/20; B60R 1/22; F21S 8/03
(Continued)

(56) References Cited

U.S. PATENT DOCUMENTS 4,413,451 A * 11/1983 Featherstone ......... E04H 12/182
  52/118
10,759,357 B2 * 9/2020 Wagner, Sr. .............. B60P 3/18
(Continued)

*Primary Examiner* — Jason S Daniels
(74) *Attorney, Agent, or Firm* — JCIPRNET

(57) ABSTRACT

A utility vehicle for power emergency repair includes a cab, a carriage and a lighting device, including mounting bases, a wire pole, a rotary base and a lamp assembly. A rotary shaft is bridged between the mounting bases, and the rotary base is fixedly connected to the rotary shaft. First and second positioning units are provided on the top of the carriage. The rotary base has first and second positioning surfaces, the first positioning unit includes a first limiting platform, and the second positioning unit includes a rotation limiting plate and positioning plates. The positioning plates is supported on a lower end surface of the rotation limiting plate. The utility vehicle further includes a driving assembly and first and second contacts. A trigger signal is generated and the driving assembly is controlled to release braking on the rotary shaft when the first and second contacts contact each other.

7 Claims, 4 Drawing Sheets

(51) Int. Cl.
*F21S 8/08* (2006.01)
*F21V 21/22* (2006.01)
*B60P 1/43* (2006.01)
*B60R 7/08* (2006.01)
*F21Y 115/10* (2016.01)

(52) U.S. Cl.
CPC ............... *B60P 1/43* (2013.01); *B60R 7/08* (2013.01); *F21Y 2115/10* (2016.08)

(58) Field of Classification Search
USPC .......................... 296/181.1, 190.01, 193.12
See application file for complete search history.

(56) References Cited

U.S. PATENT DOCUMENTS

| | | | |
|---|---|---|---|
| 11,135,966 B1* | 10/2021 | Regenauer | B60Q 1/2657 |
| 11,898,364 B2* | 2/2024 | Fackler | B60Q 1/307 |
| 2010/0205990 A1* | 8/2010 | French | B60H 1/00264 |
| | | | 237/28 |
| 2011/0280001 A1* | 11/2011 | Burgess | B66B 9/04 |
| | | | 362/85 |

\* cited by examiner

UTILITY VEHICLE FOR POWER EMERGENCY REPAIR

CROSS-REFERENCE TO RELATED APPLICATION

This application claims the priority benefit of China application no. 202210009975.5, filed on Jan. 6, 2022. The entirety of the above-mentioned patent application is hereby incorporated by reference herein and made a part of this specification.

BACKGROUND

Technical Field

The present invention belongs to the technical field of power repair tool transportation, in particular to a utility vehicle for power emergency repair.

Description of Related Art

Utility vehicles are equipment that can be widely used for electric power distribution operations and electric power facility emergency repair work in various emergency situations, and are mainly applied for emergency response, such as emergency repair, field emergency rescue and disaster relief work, etc., against various power outage accidents. In the modern society with highly developed economy, science and technology, it is an urgent mission for our government to establish and improve social public security mechanisms, so as to take preventive measures and make rapid response against various accidents. Utility vehicles are an important component of the mission. In the electric power facility emergency repair work, harsh site environments, such as high temperature, low temperature, open fire, rough ground, soft ground, etc., are often encountered. It is highly necessary to ensure that the utility vehicles can park stably and carry out the repair work orderly and efficiently.

It is necessary to use lighting equipment during working at night. Presently, utility vehicles are usually equipped with a lamp that can be laid down. However, when the lamp is used in a vertical state, it tends to topple and fall along with the movement of the utility vehicle. Consequently, there is a severe impact on the output shaft of the motor and the service life of the motor may be shortened if the lamp is used for a long time in the vertical state. Therefore, it is highly necessary to design a device that can reduce the impact of the torque generated by the lamp on the motor when the lamp is used in the vertical state.

SUMMARY

The object of the present invention is to provide a utility vehicle for power emergency repair, which can effectively adapt to harsh working environments, ensure the safety of emergency repair work, improve the efficiency of emergency repair work, improve the fixing stability of the lighting device, and prolong the overall service life of the lamp assembly.

The present invention provides a utility vehicle for power emergency repair, which comprises a cab and a carriage. A lighting device is provided on a top portion of the carriage and comprises two mounting bases, a wire pole, a rotary base and a lamp assembly. The two mounting bases are parallel to each other and are fixed to the top portion of the carriage. A rotary shaft is bridged between the two mounting bases, the rotary base is fixedly connected to the rotary shaft, one end of the wire pole is fixedly connected to the rotary base, the other end of the wire pole is provided with the lamp assembly, and the wire pole and the rotary base have a horizontal state and a vertical state. A positioning device for limiting the wire pole in the vertical state is provided on the top portion of the carriage, and the positioning device comprises a first positioning unit and a second positioning unit. The rotary base has a first positioning surface and a second positioning surface. The first positioning unit comprises a first limiting platform, which is located at one side of the rotary shaft and has a side abutting against the first positioning surface of the rotary base when the rotary base is in the vertical state. The second positioning unit is located at the other side of the rotary shaft and comprises a mounting slot arranged in the top portion of the carriage, a rotation limiting plate that can rotate in a vertical plane is mounted in the mounting slot, a torsion spring is connected to a rotary connecting part of the rotation limiting plate inside the mounting slot, and the rotation limiting plate always abuts against the second positioning surface of the rotary base under an action of the torsion spring. Two positioning plates that are telescopically movable are respectively provided on two opposite side walls of the mounting slot, and the positioning plates extend out and support a lower end surface of the rotation limiting plate when the rotation limiting plate rotates to a vertical state. The utility vehicle for power emergency repair further comprises a driving assembly for driving the rotary shaft to rotate, an end of one of the positioning plates is provided with a first contact, an end of the other one of the positioning plates is provided with a second contact, and the first contact and the second contact is contactable to generate a trigger signal and control the driving assembly to release the braking on the rotary shaft.

Preferably, each of the side walls of the mounting slot is provided with a mounting hole for mounting a respective one of the positioning plates, each positioning plate is slidably mounted in the mounting hole, a spring is connected between each positioning plate and a bottom wall of the mounting hole, an electromagnet is provided on the bottom wall of the mounting hole, and a magnetic block corresponding to the electromagnet is provided on an inner end surface of each positioning plate. When the electromagnet is not energized, each positioning plate extends out of the mounting hole under an action of the spring. When the electromagnet is energized, each positioning plate retracts into the mounting hole under an action of magnetic force.

Preferably, the first positioning surface of the rotary base is provided with a boss, which abuts against an upper end surface of the first limiting platform when the rotary base is in the vertical state.

Preferably, an electric control unit, a display unit and a vehicle backup camera unit are provided inside the cab, a storage rack and a surveillance camera are provided inside the carriage, the surveillance camera is in communicative connection with the display unit, and a rotatable hydraulic trail plank is provided on a rear wall of the carriage.

Preferably, the lighting device further comprises a bracket arranged on a side of the mounting bases for supporting the lamp assembly, the lamp assembly comprises a power supply unit and an illuminating lamp, the power supply unit is connected to a power source in the utility vehicle through a cable, and the cable is spirally wound on the wire pole. The illuminating lamp employs an LED lamp, and the wire pole is a hydraulically controlled telescopic structure, which can extend to a maximum length of 1.8 meters.

Preferably, the storage rack has a plurality of storage areas for storing different tools.

Preferably, the rear wall of the carriage is provided with a supporting frame located at the lower part of a door panel, one end of the hydraulic trail plank is hinged to the supporting frame via a pin shaft, a first hydraulic cylinder is mounted to a bottom portion of the carriage, a telescopic end of the first hydraulic cylinder is connected to the hydraulic trail plank, and the first hydraulic cylinder drives the hydraulic trail plank to rotate.

In summary, with the technical scheme of the present invention, at least the following beneficial effects can be attained.

1. With the first positioning unit and the second positioning unit, the rotary base can be positioned in two directions when the rotary base is in the vertical state, thus the load on the motor is reduced when the rotary base is in the vertical state.

2. With the design of the rotation limiting plate and the torsion spring in the second positioning unit, the second positioning unit can rotate with the rotation of the rotary base, and the torsion of the torsion spring can overcome the gravity of the rotary base and the wire pole, thus the load on the rotary shaft of the motor is reduced.

3. With the design of the positioning plates and the electromagnet, the positioning plates can extend and retract automatically, and can automatically cooperate with the rotation limiting plate to realize the positioning of the rotation limiting plate, thereby achieving a better limiting effect on the wire pole and the rotary base.

4. With the first contact and the second contact, the positions of the positioning plates can be detected, and an effect of protecting the driving assembly is attained.

5. With the rotatable hydraulic trail plank, it is convenient to transport tools into the carriage and take out tools from the carriage.

6. With the rotatable lighting device, the lighting requirement is ensured, and the operating efficiency is improved.

BRIEF DESCRIPTION OF THE DRAWINGS

To explain the technical scheme in the embodiments of the present invention more clearly, hereunder the drawings to be used in the description of the embodiments will be introduced briefly. Obviously, the drawings used in the description below only illustrate some embodiments of the present invention, and those having ordinary skills in the art can work out other drawings based on these drawings without expending any creative labor.

DESCRIPTION OF THE EMBODIMENTS

Hereunder the technical scheme in the embodiments of the present invention will be detailed clearly and completely with reference to the accompanying drawings of the embodiments. Obviously, the embodiments described herein are only some embodiments of the present invention, but not all possible embodiments of the present invention. Those having ordinary skills in the art can obtain other embodiments based on the embodiments described herein without expending any creative labor; however, all such embodiments shall be deemed as falling in the scope of protection of the present invention.

Figure 1:
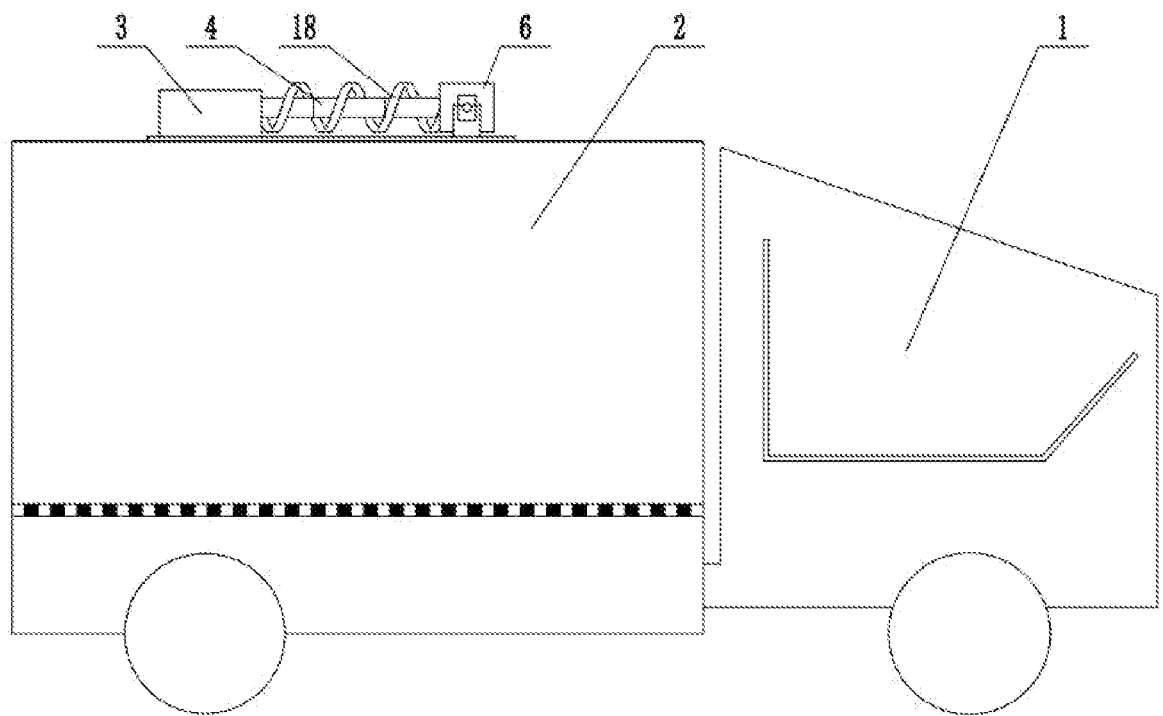
FIG. 1 is a schematic front view of the overall structure of a utility vehicle for power emergency repair in the present invention.
Figure 2:
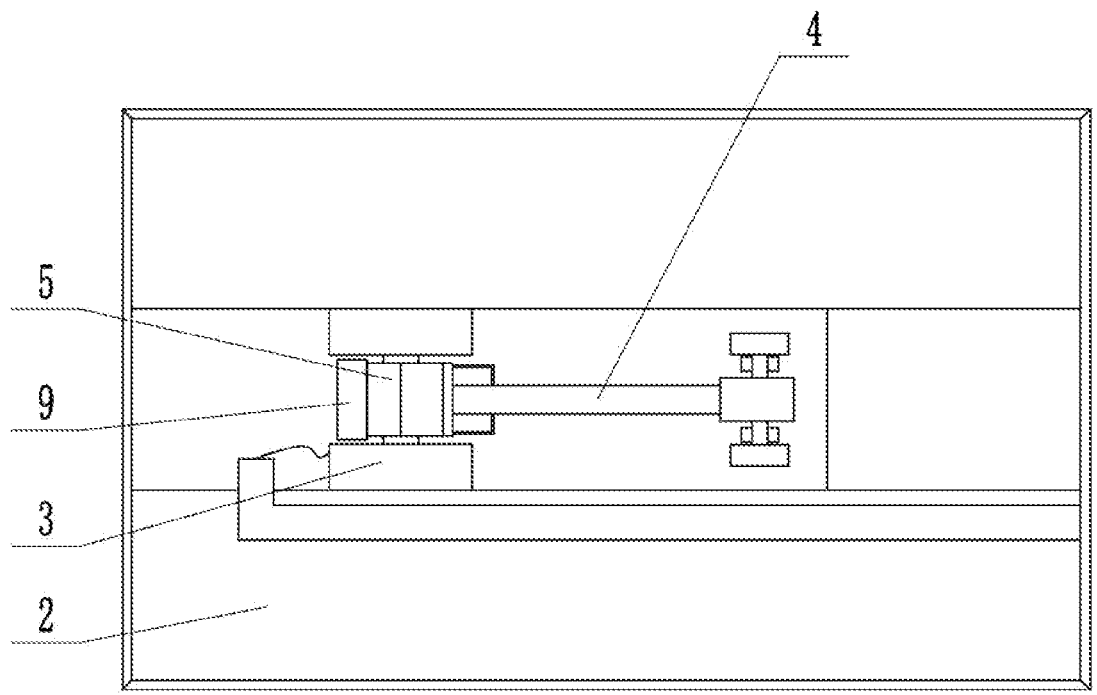
FIG. 2 is a top view of the utility vehicle for power emergency repair in the present invention.
Figure 3:
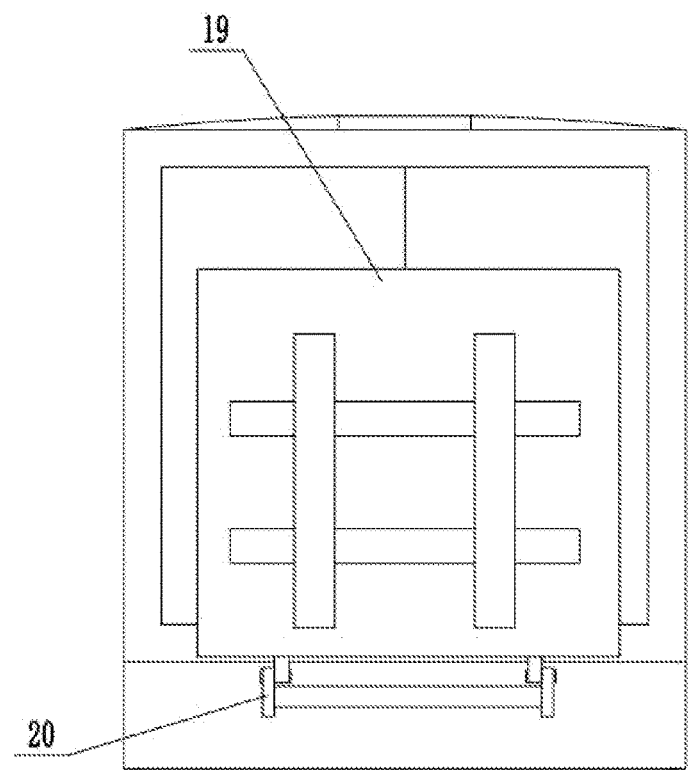
FIG. 3 is a side view of the utility vehicle for power emergency repair in the present invention (with a wire pole being removed)
Figure 4:
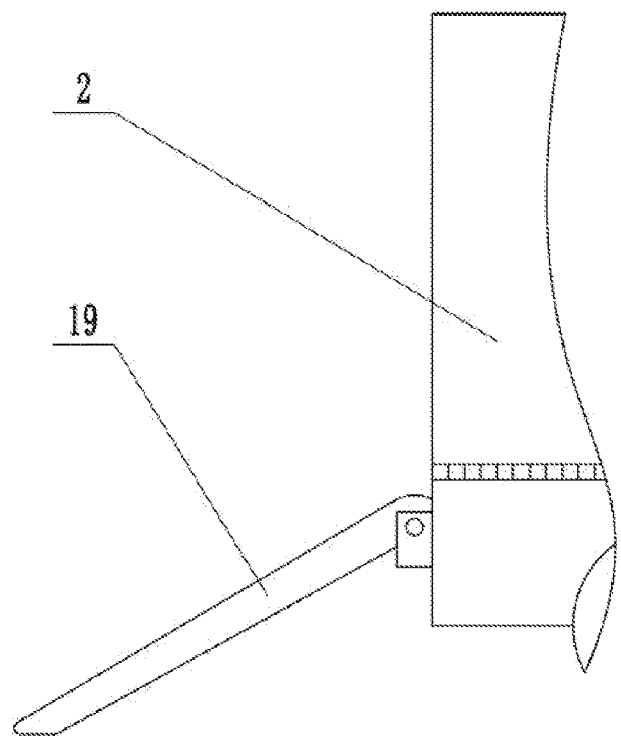
FIG. 4 is a schematic view of the utility vehicle for power emergency repair in the present invention, with a hydraulic trail plank in an open state.
Figure 5:
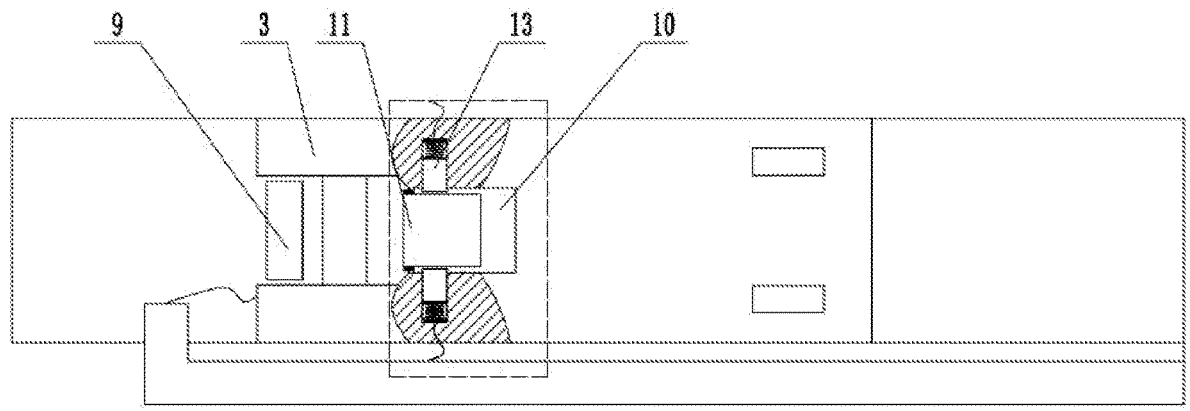
FIG. 5 is a top view of the utility vehicle for power emergency repair in the present invention (with the wire pole being removed)
Figure 6:
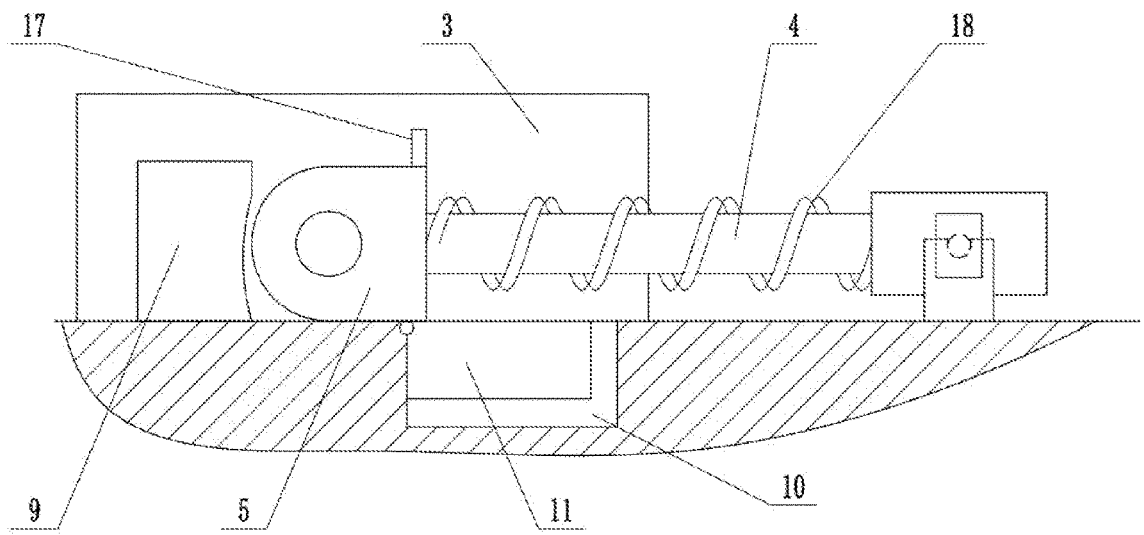
FIG. 6 is a schematic partial view of the utility vehicle for power emergency repair in the present invention, with the wire pole in a horizontal state.
Figure 7:
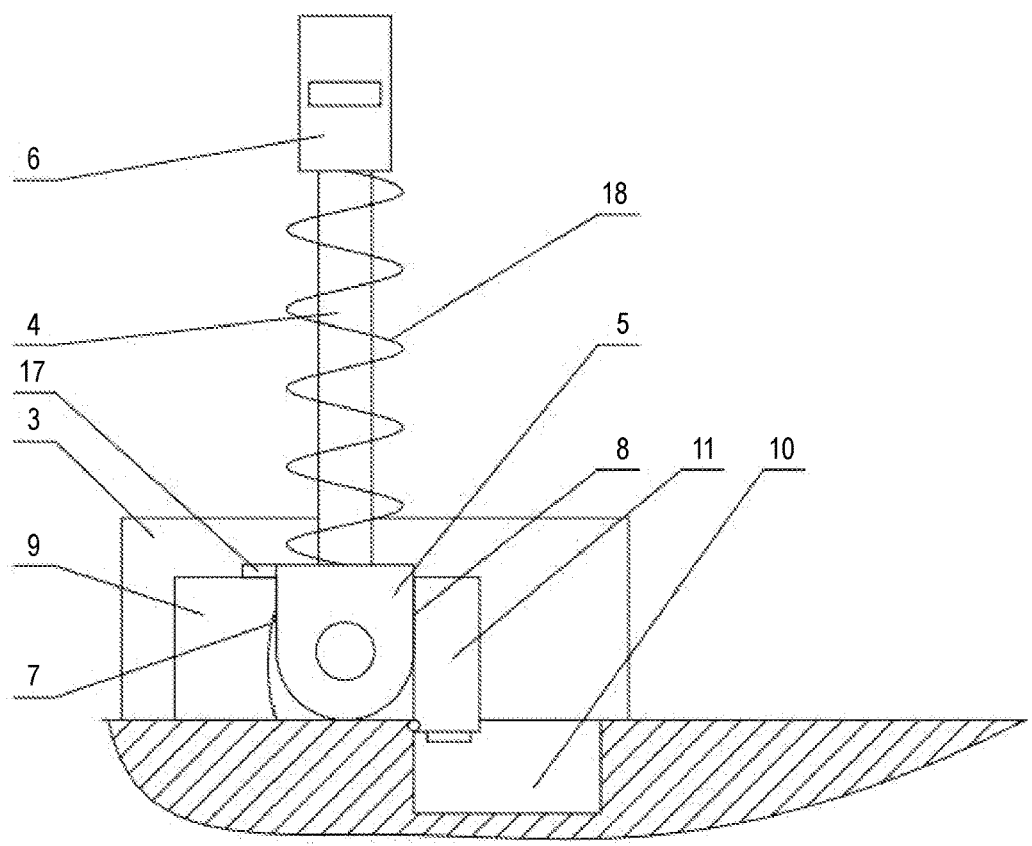
FIG. 7 is a schematic partial view of the utility vehicle for power emergency repair in the present invention, with the wire pole in a vertical state.
Figure 8:
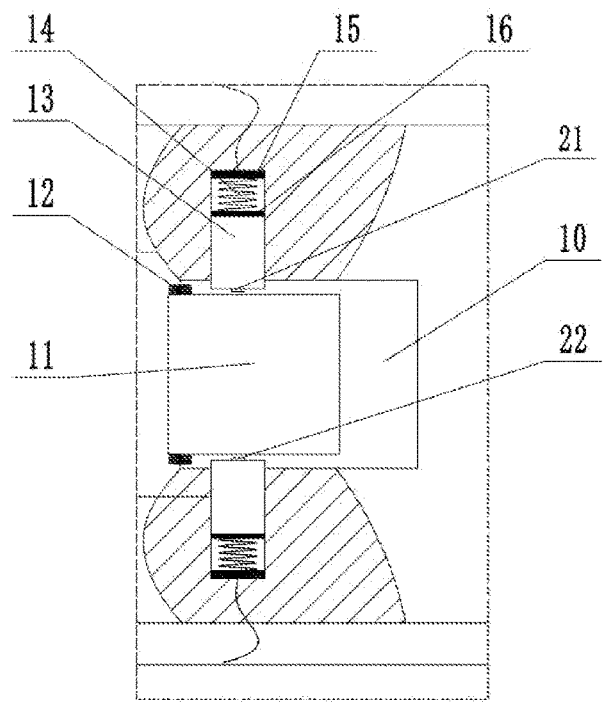
FIG. 8 is a partial enlarged view of the structure in FIG. 5 in the present invention.

The present invention provides a utility vehicle for power emergency repair. As shown in FIG. 1 to FIG. 8, the utility vehicle comprises a cab 1 and a carriage 2. A lighting device is provided on the top portion of the carriage 2 and comprises mounting bases 3, a wire pole 4, a rotary base 5 and a lamp assembly 6. There are two mounting bases 3, which are in parallel to each other and are fixed to the top portion of the carriage 2. A rotary shaft is bridged between the two mounting bases 3, the rotary base 5 is fixedly connected to the rotary shaft, one end of the wire pole 4 is fixedly connected to the rotary base 5, the other end of the wire pole 4 is provided with the lamp assembly 4, and the wire pole 4 and the rotary base 5 have a horizontal state and a vertical state. When the wire pole 4 is in the horizontal state, the lighting device is not in a working state. When the wire pole 4 is in the vertical state, a lighting mode is enabled. If the wire pole is limited only by the driving assembly (usually a motor) when it is in the vertical state, the motor may be damaged easily, owing to a fact that the wire pole 4 has a laterally toppling torque under the action of its own gravity in the vertical state. In the present invention, a positioning device for limiting the wire pole 4 in the vertical state is provided on the top portion of the carriage 2. The positioning device comprises a first positioning unit and a second positioning unit. The rotary base 5 has a first positioning surface 7 and a second positioning surface 8. The first positioning unit comprises a first limiting platform 9, which is located at one side of the rotary shaft and has a side abutting against the first positioning surface 7 of the rotary base 5 when the rotary base 5 in the vertical state. The first positioning unit achieves a positioning effect by means of the first positioning surface 7 and the first limiting platform 9 jointly, so as to limit the toppling of the wire pole 4 in a direction.

The second positioning unit is located at the other side of the rotary shaft, and comprises a mounting slot 10 arranged in the top portion of the carriage 2. A rotation limiting plate 11 that can rotate in a vertical plane is mounted in the mounting slot 10, a torsion spring 12 is connected to a rotary connecting part of the rotation limiting plate 11 in the mounting slot 10, and the rotation limiting plate 11 always abuts against the second positioning surface 8 of the rotary base 5 under the action of the torsion spring 12; during actual use, by virtue of the design of the torsion spring 12, the abutting between the rotation limiting plate 11 and the second positioning surface 8 is ensured, and the torque generated by the weight of the wire pole can be offset partially by the torsional force applied to the wire pole by the torsion spring 12 when the wire pole 4 is erected or lowered, thus the rotation torque of the driving assembly is reduced, and the wire pole 4 can be erected and lowered stably.

In order to realize a positioning effect of the rotation limiting plate 11 on the wire pole 4 when the wire pole 4 is in the vertical state, reciprocatively telescopic positioning plates 13 are respectively provided on the two opposite side walls of the mounting slot 10, and the positioning plates 13 extend out and support a lower end surface of the rotation limiting plate 11 when the rotation limiting plate 11 rotates to a vertical state. It should be noted that there are two positioning plates 13, which are symmetrically arranged on the two opposite side walls of the mounting slot 10. The two positioning plates 13 move towards or against each other synchronously, an end of one of the positioning plates 13 is provided with a first contact 21, and an end of the other one of the positioning plates 13 is provided with a second contact 22. The utility vehicle of the present invention further comprises a driving assembly for driving the rotary shaft to rotate. A trigger signal can be generated when the first contact 21 and the second contact 22 come into contact with each other, and the driving assembly can be controlled by the trigger signal to release the braking on the rotary shaft. When the first contact 21 and the second contact 22 come into contact with each other, it means that the two positioning plates 13 are located in the middle of the lower end of the rotation limiting plate 11. At that point, a good supporting effect is attained, and the driving assembly releases the braking on the rotary shaft, so that the wire pole 4 is positioned by the first positioning unit and the second positioning unit, thus the damage to the driving assembly can be reduced. In this embodiment, the first contact 21 and the second contact 22 may employ sensors, such as pressure sensors or photoelectric sensors, etc.

In the present invention, in order to realize the synchronous action of the two positioning plates 13, each of the side walls of the mounting slot 10 is provided with a mounting hole for mounting a respective one of the positioning plates 13, and each of the positioning plates 13 is slidably mounted in the mounting hole. A spring 14 is connected between each positioning plate 13 and the bottom wall of the mounting hole, an electromagnet 15 is provided on the bottom wall of the mounting hole, and a magnetic block 16 corresponding to the electromagnet 15 is provided on an inner end surface of each positioning plate 13. When the electromagnet 15 is not energized, the positioning plate 13 extends out of the mounting hole under the action of the spring 14. When the electromagnet 15 is energized, the positioning plate 13 retracts into the mounting hole under the action of the magnetic force, and the two electromagnets 15 are controlled by the same circuit.

In order to improve the limiting effect of the first positioning unit, the first positioning surface 7 of the rotary base 5 is provided with a boss 17, which abuts against an upper end surface of the first limiting platform 9 when the rotary base 5 is in the vertical state. Thus, when the wire pole 4 is rotated to the side of the first positioning unit, the boss 17 is pressed on the first limiting platform 19, thus the friction between the first limiting platform 9 and the top portion of the carriage can be increased, and a better limiting effect can be attained.

In order to improve the convenience in using the utility vehicle, an electric control unit, a display unit and a vehicle backup camera unit are provided in the cab 1, to facilitate the operation and use of the vehicle. In addition, a storage rack and a surveillance camera are provided in the carriage 2, and the surveillance camera is in communicative connection with the display unit. A rotatable hydraulic trail plank 19 is provided on the rear wall of the carriage 2, a supporting frame 20 located at the lower part of the door panel is mounted on the rear wall of the carriage 2, one end of the hydraulic trail plank 19 is hinged to the supporting frame 20 via a pin shaft, a first hydraulic cylinder is mounted to the bottom portion of the carriage 2, a telescopic end of the first hydraulic cylinder is connected to the hydraulic trail plank 19, and the first hydraulic cylinder drives the hydraulic trail plank 19 to rotate. Through the rotation of the hydraulic trail plank 19, a free end of the hydraulic trail plank 19 can be rotated to a position where the free end comes into contact with the ground, thus the hydraulic trail plank 19 from a ramp, by means of which heavy tools can be conveyed into the carriage or taken out of the carriage conveniently.

In the present invention, the lighting device further comprises a bracket arranged on a side of the mounting bases 3 for supporting the lamp assembly 6, the lamp assembly 6 comprises a power supply unit and an illuminating lamp, the power supply unit is connected to a power source in the utility vehicle through a cable 18, and the cable 18 is spirally wound on the wire pole 4 to adapt to the extension/retraction of the wire pole 4 and avoid disordered arrangement of the cable 18. The illuminating lamp employs an LED lamp, and the wire pole 4 is a hydraulically controlled telescopic structure, which can extend to a maximum length of 1.8 meters.

In the present invention, the storage rack has a plurality of storage areas for storing different tools, thus the storage rack can be used for storing electric power facility repair tools in different types and sizes.

In summary, with the utility vehicle for power emergency repair provided by the present invention, the lighting requirements can be met, and the operating efficiency can be improved. In addition, with the first positioning unit and the second positioning unit, the rotary base can be positioned in two directions when the rotary base is in the vertical state, thus the load on the motor is reduced when the rotary base is in the vertical state. With the first contact and the second contact, the positions of the positioning plates can be detected, and an effect of protecting the driving assembly is attained by reducing the load on the driving assembly, and with the rotatable hydraulic trail plank, it is convenient to transport tools.

While some preferred embodiments of the present invention are described above, the present invention is not limited to those embodiments. It should be noted that those having ordinary skills in the art can make various improvements and modifications to the embodiments without departing from the principle of the present invention. However, all such improvements and modifications shall also be deemed as falling in the scope of protection of the present invention.

What is claimed is:

1. A utility vehicle for power emergency repair, the utility vehicle comprising a cab and a carriage, wherein a lighting device is provided on a top portion of the carriage and comprises two mounting bases, a wire pole, a rotary base and a lamp assembly, wherein the two mounting bases are parallel to each other and are fixed to the top portion of the carriage; a rotary shaft is bridged between the two mounting bases, the rotary base is fixedly connected to the rotary shaft, one end of the wire pole is fixedly connected to the rotary base, the other end of the wire pole is provided with the lamp assembly, and the wire pole and the rotary base have a horizontal state and a vertical state; a positioning device for limiting the wire pole in the vertical state is provided on the top portion of the carriage, and the positioning device comprises a first positioning unit and a second positioning unit; the rotary base has a first positioning surface and a second positioning surface; the first positioning unit comprises a first limiting platform, which is located at one side of the rotary shaft and has a side abutting against the first positioning surface of the rotary base when the rotary base is in the vertical state; the second positioning unit is located at the other side of the rotary shaft, and the second positioning unit comprises a mounting slot arranged in the top portion of the carriage, wherein a rotation limiting plate that is rotatable in a vertical plane is mounted in the mounting slot, a torsion spring is connected to a rotary connecting part of the rotation limiting plate inside the mounting slot, and the rotation limiting plate always abuts against the second positioning surface of the rotary base under an action of the torsion spring; two positioning plates that are telescopically movable are respectively provided on two opposite side walls of the mounting slot, and the two positioning plates are movable towards or against each other synchronously, and the two positioning plates extend out and support a lower end surface of the rotation limiting plate when the rotation limiting plate rotates to a vertical state;

the utility vehicle for power emergency repair further comprising a driving assembly for driving the rotary shaft to rotate, wherein an end of one of the positioning plates is provided with a first contact, an end of the other one of the positioning plates is provided with a second contact, and the first contact and the second contact is contactable to generate a trigger signal and control the driving assembly to release braking on the rotary shaft.

2. The utility vehicle for power emergency repair according to claim 1, wherein each of the side walls of the mounting slot is provided with a mounting hole for mounting a respective one of the positioning plates, each positioning plate is slidably mounted in the mounting hole, a spring is connected between each positioning plate and a bottom wall of the mounting hole, an electromagnet is provided on the bottom wall of the mounting hole, and a magnetic block corresponding to the electromagnet is provided on an inner end surface of each positioning plate; when the electromagnet is not energized, each positioning plate extends out of the mounting hole under an action of the spring; when the electromagnet is energized, each positioning plate retracts into the mounting hole under an action of magnetic force.

3. The utility vehicle for power emergency repair according to claim 1, wherein the first positioning surface of the rotary base is provided with a boss, which abuts against an upper end surface of the first limiting platform when the rotary base is in the vertical state.

4. The utility vehicle for power emergency repair according to claim 1, wherein an electric control unit, a display unit and a vehicle backup camera unit are provided inside the cab, a storage rack and a surveillance camera are provided inside the carriage, the surveillance camera is in communicative connection with the display unit, and a rotatable hydraulic trail plank is provided on a rear wall of the carriage.

5. The utility vehicle for power emergency repair according to claim 4, wherein the lighting device further comprises a bracket arranged on a side of the mounting bases for supporting the lamp assembly, the lamp assembly comprises a power supply unit and an illuminating lamp, the power supply unit is connected to a power source in the utility vehicle through a cable, and the cable is spirally wound on the wire pole; the illuminating lamp employs an LED lamp, and the wire pole is a hydraulically controlled telescopic structure, which is able to extend to a maximum length of 1.8 meters.

6. The utility vehicle for power emergency repair according to claim 4, wherein the storage rack has a plurality of storage areas for storing different tools.

7. The utility vehicle for power emergency repair according to claim 4, wherein the rear wall of the carriage is provided with a supporting frame located at a lower part of a door panel, one end of the hydraulic trail plank is hinged to the supporting frame via a pin shaft, a first hydraulic cylinder is mounted to a bottom portion of the carriage, a telescopic end of the first hydraulic cylinder is connected to the hydraulic trail plank, and the first hydraulic cylinder drives the hydraulic trail plank to rotate.

\* \* \* \* \*